United States Patent
Mukherjee et al.

(10) Patent No.: US 10,782,896 B2
(45) Date of Patent: *Sep. 22, 2020

(54) LOCAL INSTRUCTION ORDERING BASED ON MEMORY DOMAINS

(71) Applicant: Cavium, LLC, Santa Clara, CA (US)

(72) Inventors: Shubhendu Sekhar Mukherjee, Southborough, MA (US); Richard Eugene Kessler, Northborough, MA (US); Mike Bertone, Marlborough, MA (US); Chris Comis, Holliston, MA (US); Bryan Chin, San Diego, CA (US)

(73) Assignee: Marvell Asia Pte, Ltd., Singapore (SG)

(*) Notice: Subject to any disclaimer, the term of this patent is extended or adjusted under 35 U.S.C. 154(b) by 133 days.

This patent is subject to a terminal disclaimer.

(21) Appl. No.: 16/240,104

(22) Filed: Jan. 4, 2019

(65) Prior Publication Data

US 2019/0138232 A1  May 9, 2019

Related U.S. Application Data

(63) Continuation of application No. 14/840,323, filed on Aug. 31, 2015, now Pat. No. 10,216,430.

(60) Provisional application No. 62/187,397, filed on Jul. 1, 2015.

(51) Int. Cl.
G06F 3/06 (2006.01)

(52) U.S. Cl.
CPC ............ G06F 3/0619 (2013.01); G06F 3/067 (2013.01); G06F 3/0659 (2013.01)

(58) Field of Classification Search
CPC .................................................... G06F 3/0619
See application file for complete search history.

(56) References Cited

U.S. PATENT DOCUMENTS

| | | | |
|---|---|---|---|
| 5,566,321 A | 10/1996 | Pase et al. | |
| 6,108,737 A | 8/2000 | Sharma et al. | |
| 9,323,714 B2 | 4/2016 | Dobbs et al. | |
| 10,216,430 B2 * | 2/2019 | Mukherjee | G06F 3/0619 |
| 2004/0030871 A1 | 2/2004 | Schlansker et al. | |
| 2006/0161741 A1 | 7/2006 | Yasue et al. | |
| 2014/0281403 A1 | 9/2014 | Fox et al. | |
| 2015/0254207 A1 | 9/2015 | Kessler | |
| 2016/0140051 A1 | 5/2016 | Kessler et al. | |
| 2016/0140060 A1 | 5/2016 | Mukherjee et al. | |
| 2016/0224398 A1 | 8/2016 | Palmer et al. | |

* cited by examiner

*Primary Examiner* — William B Partridge
(74) *Attorney, Agent, or Firm* — Young Basile Hanlon & MacFarlane, P.C.

(57) ABSTRACT

A method for managing an observed order of instructions in a computing system includes utilizing an overloaded memory barrier instruction to specify whether a global ordering constraint or a local ordering constraint is enforced.

36 Claims, 16 Drawing Sheets

LOCAL INSTRUCTION ORDERING BASED ON MEMORY DOMAINS

CROSS-REFERENCE TO RELATED APPLICATIONS

This application is a continuation of and claims the benefit of U.S. application Ser. No. 14/840,323, filed Aug. 31, 2015, which claims the benefit of U.S. Provisional Application No. 62/187,397 filed Jul. 11, 2015, each of which is incorporated herein by reference.

BACKGROUND

This invention relates to memory barrier instructions for enforcing a desired order of execution for memory instructions in a multi-socket, multi-core computing system.

In general, a computer program written by a computer programmer includes a number of operations for accessing memory in the computer system. In the computer program, the memory operations have an order specified by the computer programmer. In many modern computing systems, the memory is shared among multiple devices such as multiple processing elements and memory-mapped peripherals (e.g., I/O devices).

Due to the memory being shared among multiple devices in the computing system, the memory operations may potentially be executed in an order other than the order specified by the user. In some examples, such "out of order" memory operations have no side effects. In other examples, out of order memory operations can adversely affect the behavior of the computer program. For example, reordering of a first instruction that writes a memory address and a second instruction that reads the memory address to obtain the result of the first instruction may result in an incorrect value being read by the second instruction.

To manage out of order memory operations, many modern processor architectures implement memory barrier instructions. Very generally, memory barrier instructions enforce an ordering constraint on memory operations issued before and after the memory barrier instruction. In some examples, memory operations issued before a memory barrier instruction are guaranteed to have completed before memory operations issued after the memory barrier instruction.

SUMMARY

In an aspect, in general, a method for managing an observed order of instructions in a computing system includes executing a number of instructions at a first number of processing elements in the computing system. The executing includes issuing a first subset of the number of instructions at a first processing element, a first instruction of the first subset of the number of instructions being configured to access resources associated with a second number of processing elements in the computing system and issuing a second instruction of the number of instructions at the first processing element, the second instruction causing the first processing element to pause execution of the number of instructions until the first processing element receives one or more first acknowledgements that all processing elements of the first number of processing elements have observed issuance of the first subset of the number of instructions. The first processing element receives the one or more first acknowledgements before the first processing element receives a second acknowledgement that the second number of processing elements of the second multi-element processing device have observed issuance of the first instruction.

Aspects may include one or more of the following features.

The method may include issuing a second subset of the number of instructions at a second processing element of the first number of processing elements, the second subset including a third instruction configured to access the resources associated with the second number of processing elements, wherein the instructions of the second subset are constrained to issue after completion of the second instruction is observed by the first plurality of processing elements. At least some of the processing elements of the second number of processing elements may observe issuance of one or more instructions of the second subset as occurring prior to issuance of one or more instructions of the first subset. The second instruction may include a memory barrier instruction.

The first plurality of processing elements may include a first ordering point from which the one or more first acknowledgements originate and the second plurality of processing elements may include a second ordering point from which the second acknowledgement originates. Instructions received at the first ordering point in a first received order may be issued at the first number of processing elements in the first received order and instructions received at the second ordering point in a second received order may be issued at the second number of processing elements in the second received order. At least some instructions of the number of instructions may be memory access instructions. The at least some instructions of the number of instructions may access memory addresses associated with memory mapped peripheral devices. The at least some instructions of the number of instructions may access memory addresses associated with input/output devices.

The first instruction may be configured to access a memory address associated with an input/output device associated with the second number of processing elements. The first number of processing elements may be associated with a first multi-element processing device located in a first CPU socket and the second number of processing elements may be associated with a second multi-element processing device located in a second CPU socket.

The first number of processing elements may be associated with a first multi-element processing device located in a first CPU socket and the second number of processing elements may be associated with the first multi-element processing device located in the first CPU socket. A first subset of the first number of processing elements may be associated with a first multi-element processing device located in a first CPU socket and a second subset of the first number of processing elements may be associated with a second multi-element processing device located in a second CPU socket. A first subset of the second number of processing elements may be associated with the first multi-element processing device located in the first CPU socket and a second subset of the second number of processing elements may be associated with the second multi-element processing device located in the second CPU socket.

The method may include executing a second number of instructions at a third number of processing elements in the computing system. The executing may include issuing a third subset of the second number of instructions at a third processing element of the third number of processing elements, one or more fourth instructions of the third subset of the second number of instructions being configured to access resources associated with a fourth number of processing elements in the computing system and issuing a fifth instruction of the second number of instructions at the third processing element, the fifth instruction causing the third processing element to pause execution of the second number of instructions until the third processing element receives one or more third acknowledgements indicating that all processing elements of the fourth number of processing elements have observed issuance of the one or more fourth instructions.

In another aspect, in general, an apparatus for managing an observed order of instructions in a computing system includes a first number of processing elements for executing a number of instructions. The first number of processing elements includes a first processing element for issuing a first subset of the number of instructions, a first instruction of the first subset of the number of instructions being configured to access resources associated with a second number of processing elements in the computing system and issuing a second instruction of the number of instructions, the second instruction causing the first processing element to pause execution of the number of instructions until the first processing element receives one or more first acknowledgements that all processing elements of the first number of processing elements have observed issuance of the first subset of the number of instructions. The first processing element receives the one or more first acknowledgements before the first processing element receives a second acknowledgement that the second number of processing elements have observed issuance of the first instruction.

Very generally, aspects described herein utilize an overloaded memory barrier instruction to allow programmers to specify whether a global ordering constraint or a local ordering constraint is enforced.

Aspects may have one or more of the following advantages.

Among other advantages, aspects allow computer programmers to avoid enforcing global ordering constraints when possible, thereby improving performance of computer programs.

Other features and advantages of the invention are apparent from the following description, and from the claims.

DESCRIPTION

1 System Overview

Figure 1:
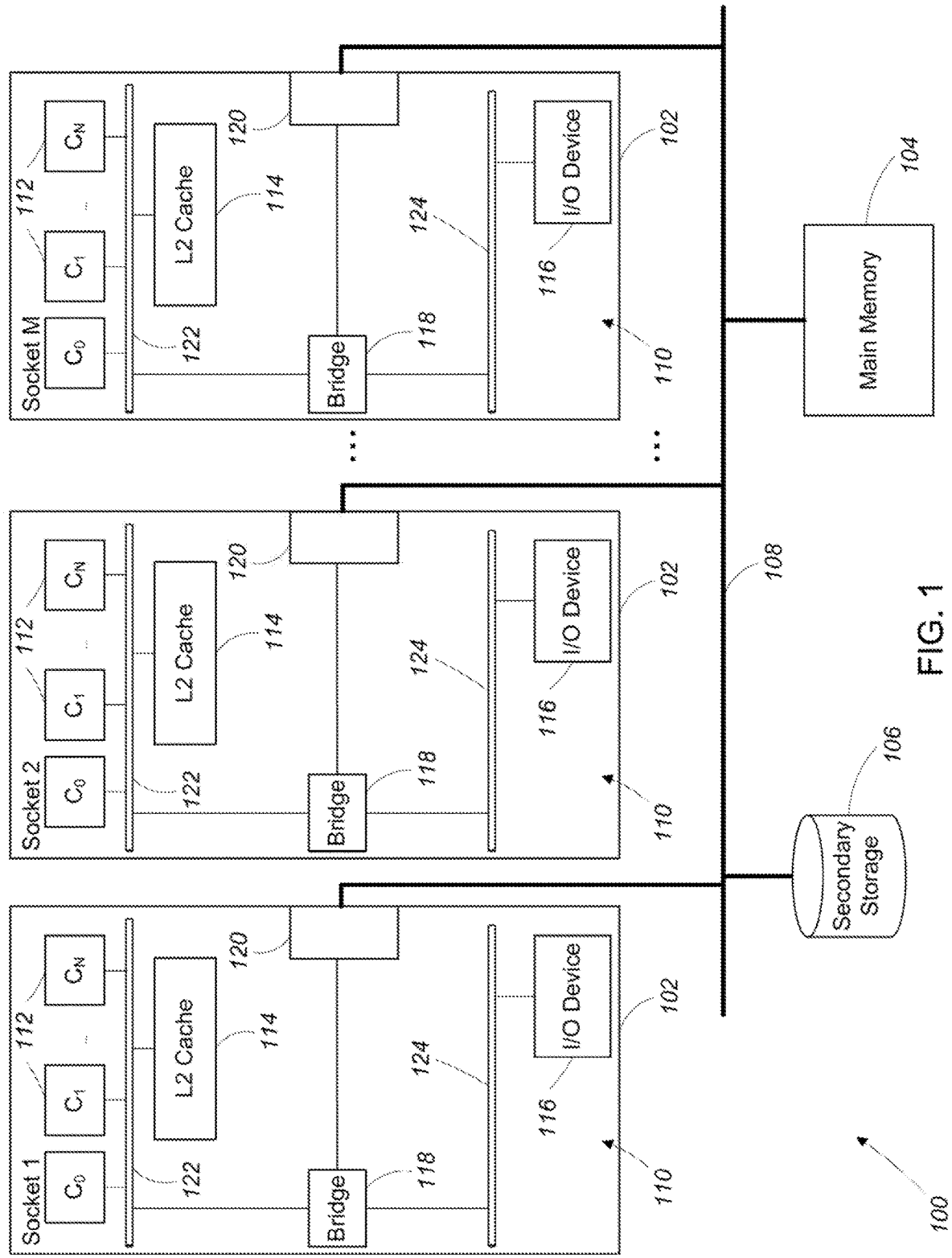
FIG. 1 is a block diagram of an embodiment of a multi-socket, multi-core computing system.

Referring to FIG. 1, a multi-socket, multi-core computing system 100 includes M CPU sockets 102 (referred to generally as "sockets"), a main memory 104 (e.g., dynamic random access memory (DRAM)), and one or more secondary storage devices 106 (e.g., a hard disk drive or a solid state storage device). The M CPU sockets 102, the main memory 104, and the one or more secondary storage devices 106 are in communication with each other over an interconnect 108.

Each of the M CPU sockets 102 includes a multi-core processing element 110. Each of the multi-core processing elements 110 includes N processor cores 112, a level 2 (L2) cache 114, an input/output (I/O) device 116, a bridge 118, and an ordering point 120. The N processor cores 112 and the L2 cache 114 are in direct communication with a processor bus 122. The I/O device 116 is in direct communication with an I/O bus 124. The processor bus 122, the I/O bus 124, and the ordering point 120 are in communication with one another via the bridge 118. Note that the ordering point 120 is represented in the figure as a distinct element. However, in many examples, the ordering point is implemented as an integral part of other elements (e.g., as part of the bridge 118 or as part of the L2 cache 114) in the multi-core processing element 110.

In general, at any given time, each of the processor cores 112 in the computing system 100 is executing instructions for one or more computer programs. At least some of the instructions being executed by the processor cores 112 are memory access instructions. The computing system 100 includes a hierarchical memory system. For example, when processor core 0 on socket 1 issues a memory access instruction for a given memory address, the level 1 cache in core 0 is first checked to determine whether a valid value for the memory address is cached in the level 1 cache. If no valid value for the memory address is cached in the level 1 cache (i.e., a level 1 cache miss), then the level 2 cache 114 of the multi-core processing element 110 in socket 1 is checked to determine whether a valid value for the memory address is cached in the level 2 cache 114. If no valid value for the memory address is cached in the level 2 cache 114 (i.e., a level 2 cache miss) the main memory 104 is checked (via the interconnect 108) to determine whether a valid value for the memory address exists in the main memory 104. If no valid value for the memory address exists in the main memory 104, a page fault occurs and control is transferred to the operating system. The operating system installs a correct translation and swaps the data from the secondary storage 106 (i.e., swap space) into main memory 104 from which it can be accessed by processor core 0 on socket 1. If, at any step in the above procedure, a valid value is found (e.g., in one of the caches), the procedure completes and the valid value is returned to the appropriate processor core (and possibly cached). The above procedure for accessing memory addresses in a hierarchical memory system is well known in the art and is not discussed any further herein.

In some examples, memory access instructions issued in a given processor core 112 access memory addresses associated with an I/O device either in the same, local socket as the given core or in another, remote socket. For example, processor core 0 on socket 1 may load or store data to a memory address associated with the I/O device 116 on socket 1 (i.e., an I/O memory access operation on a local socket) or processor core 0 on socket 1 may load or store data to a memory address associated with the I/O device 116 on socket 2 (i.e., an I/O memory access operation on a remote socket).

In some examples, when a given processor core 112 on a given multi-core processing element 110 issues a memory access instruction, the instruction is sent to the ordering point 120, where the instruction is queued (e.g., in a first-in-first-out (FIFO) queue). If the memory access instruction is directed to a memory address associated with the given multi-core processing element 110 (the memory access instruction is a "local" memory access instruction), then the memory access instruction is executed in the given multi-core processing element 110. Otherwise, if the memory access instruction is directed to a memory address associated with different, remote multi-core processing element 110 (i.e., the memory access instruction is a "remote" memory access instruction), the memory access instruction is sent from the ordering point 120 of the given multi-core processing element 110 to the ordering point 120 of the remote multi-core processing element 110 where it is queued.

In general, memory access instructions are executed in the order that they are queued at the ordering point 120. In some examples, an ordering point 120 on the same multi-core processing element 110 as a core that issued a memory access instruction is referred to as a "local ordering point" and an ordering point 120 on a different, remote multi-core processing element 110 as a core that issued a memory access instruction is referred to as a "remote ordering point."

2 Memory Access Instruction Ordering

In the multi-socket, multi-core computing system 100, a given program may be executing in parallel on a number of processor cores 112 spread across the M multi-core processing elements 110. From the perspective of the programmer, is important that the instructions of the program, including memory access instructions, at least appear to be executed in the order specified in the program. However, from the perspective of the multi-socket, multi-core computing system 100, it is only important that any reordering of memory access instructions does not cause side effects. To avoid such side effects, the multi-socket, multi-core computing system 100 uses memory barrier instructions to enforce an ordering constraint on memory operations issued before and after the memory barrier instruction.

In some examples, it is important that a constraint on an order of memory access instructions is enforced across the entire multi-socket, multi-core computing system 100 (i.e., globally). When a constraint on an order of memory access instructions issued by a given processor core 112 on a given multi-core processing element 110 is enforced globally, all of the other processor cores on all of the multi-core processing elements 110 in the multi-socket, multi-core computing system 100 observe the memory access instructions as being issued in the constrained order.

In some examples, to achieve such a global ordering of memory access instructions, one or more "global" memory barrier instructions are used. A global memory barrier instruction ensures that the issuance of further memory access instructions at a given processor core 112 on a given multi-core processing element 110 is halted until an acknowledgement is received at the given processor core 112 for each memory access instruction issued by the given processor core 112 prior to completion of the global memory barrier instruction. Once the given processor core 112 receives an acknowledgement for each memory access instruction issued by the given processor prior to completion of the global memory barrier instruction, subsequent memory access instructions after the global memory barrier can be issued.

In some examples, for each memory access instruction, the acknowledgement that is received for the memory access instruction originates from the ordering point 120 of the multi-core processing element 110 on which the memory access instruction executes. That is, for memory access instructions directed to a memory address associated with the given multi-core processing element 110, a single acknowledgement is received at the given processor core 112 when the memory access instruction is queued at the given multi-core processing element's ordering point 120. For memory access instructions directed to a memory address associated a remote multi-core processing element 110, a single acknowledgement is received at the given processor core 112 when the memory access instruction is queued at the remote multi-core processing element's ordering point 120.

Figure 2:
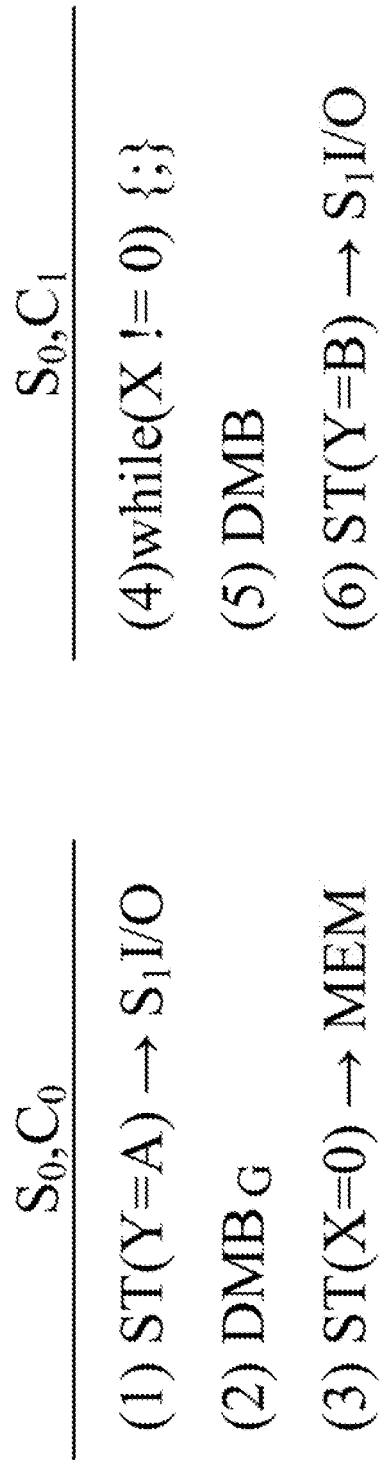
FIG. 2 is a first computer program executing on two processor cores of the computing system of FIG. 1.

Referring to FIG. 2, a simple example includes instructions of a computer program executing on two different cores (i.e., $C_0$, $C_1$) of a multi-core processing element 110 in a socket (i.e., $S_0$).

A first portion of the computer program executing on a first core of the two cores, $S_0,C_0$, includes a first memory access instruction (1) ST(Y=A)→$S_1$I/O for writing a value A to a memory address Y associated with an I/O device in a second socket, $S_1$. The first portion of the computer program also includes a global memory barrier instruction (2) $DMB_G$ for halting issuance of instructions at the first core until receiving an acknowledgement that the first memory access instruction (1) has been queued by a second ordering point 108b of a second multi-core processing element 110b in the second socket $S_1$. The first portion of the computer program also includes a second memory access instruction (3) ST(X=0)→MEM for writing a zero value to a memory address X in the main memory 104.

A second portion of the computer program executing on a second core of the two cores, $S_0,C_1$, includes a while loop (4) while (X!=0) {;} that spins while the value at the memory address X is not equal to zero. The second portion of the computer program also includes a memory barrier instruction (5) DMB for preventing memory access instructions that come after the memory barrier instruction (5) from issuing before the while loop (4) completes. The second portion of the computer program also includes a third memory access instruction (6) ST(Y=B)→$S_1$I/O for writing a value B to the memory address Y associated with the I/O device in a second socket, $S_1$. Very generally, when the simple computer program executes, the global memory barrier instruction (2) ensures that the first memory access instruction (1) issues at the second socket $S_1$ before the third memory access instruction (6).

Figure 3:
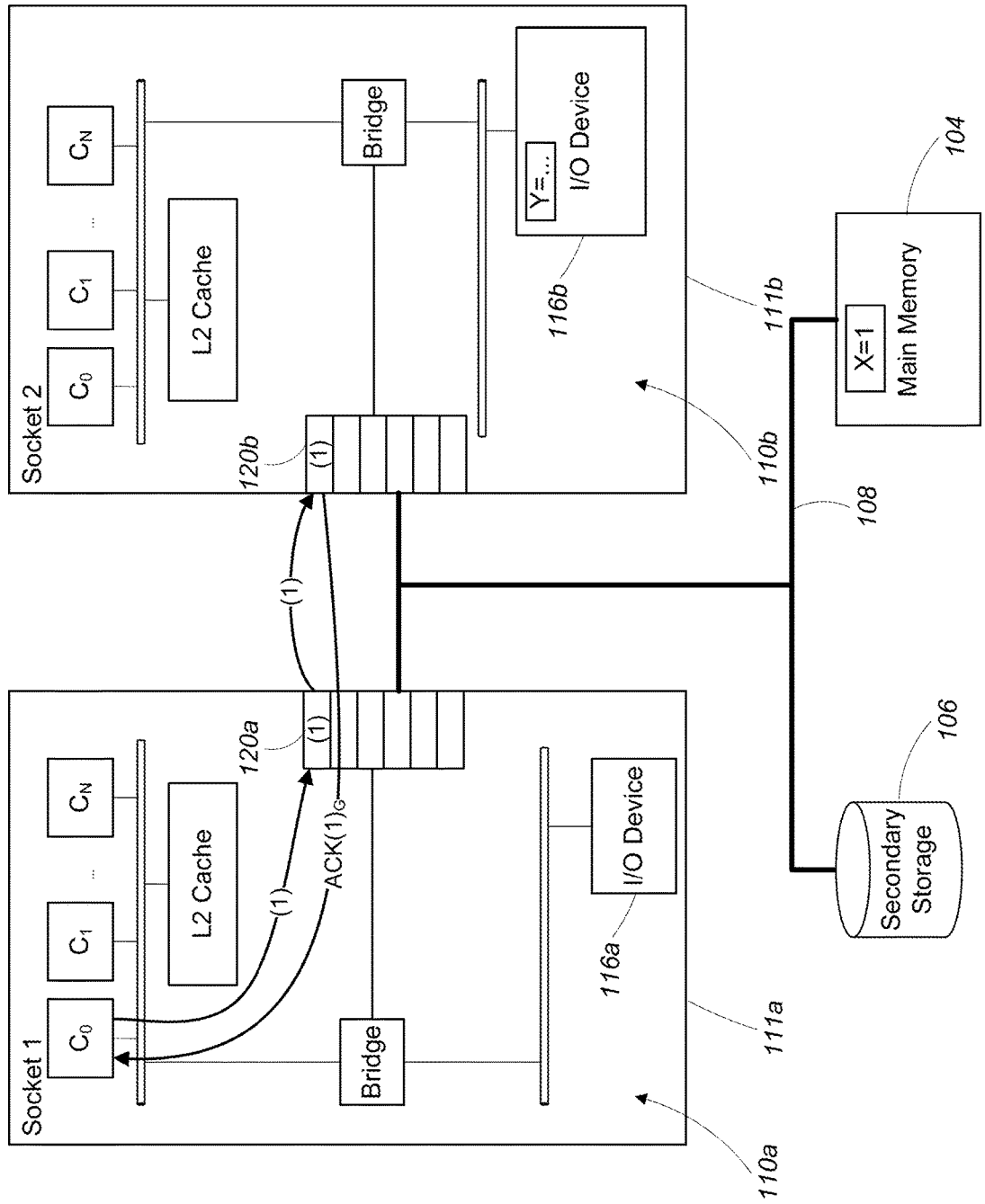
FIG. 3 illustrates a first stage of the execution of the first computer program of FIG. 2.

Referring to FIG. 3, when the simple computer program executes, the first core $S_0,C_1$, issues the first memory access instruction (1). The first core $S_0,C_1$, then issues the global memory barrier instruction (2) (not shown) which halts issuance of additional instructions on the first core until receiving an acknowledgement that the first memory access instruction (1) has been queued by a second ordering point 108b of a second multi-core processing element 110b in the second socket $S_1$.

Upon issuing, the first memory access instruction (1) is queued in a first ordering point 120a of a first multi-core processing element 110a in the first socket $S_0$. The first ordering point 120 sends the first memory access instruction (1) over the interconnect 108 to the second ordering point 120b, where the instruction is queued. Upon queuing the instruction, the second ordering point 120b sends an acknowledgement that the first memory access instruction (1) has been queued, $ACK(1)_G$, to the first core $S_0,C_1$, via the interconnect 108.

Figure 4:
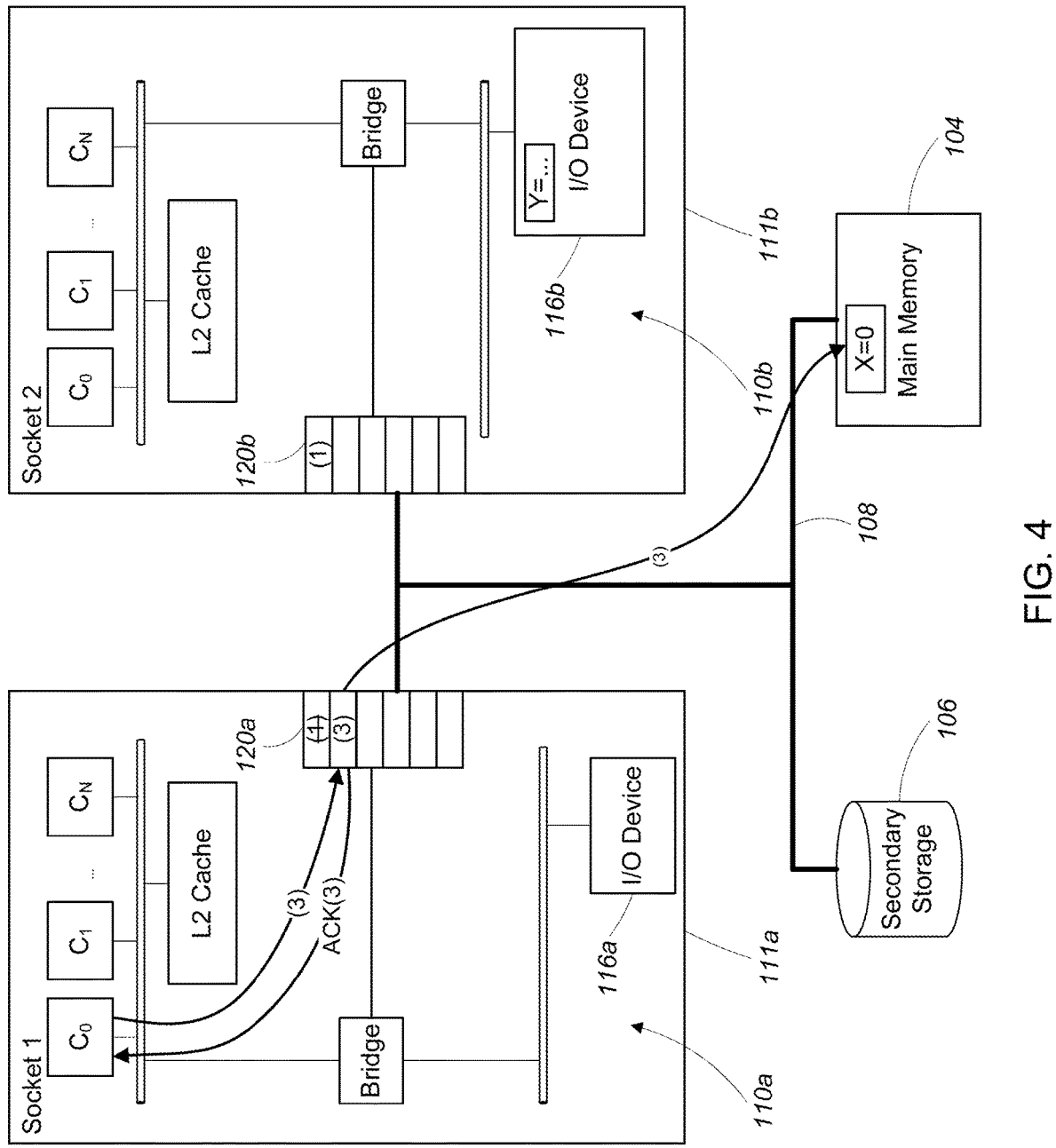
FIG. 4 illustrates a second stage of the execution of the first computer program of FIG. 2.

Referring to FIG. 4, when the first core $S_0,C_1$, receives the acknowledgement $ACK(1)_G$, the global memory barrier instruction (2) completes and the first core resumes issuing instructions, including issuing the second memory access instruction (3). Upon issuing, the second memory instruction (3) is queued in the first ordering point 120a which sends the second memory access instruction (3) over the interconnect 108 to the main memory 104 where the value zero is stored at memory address X.

Figure 5:
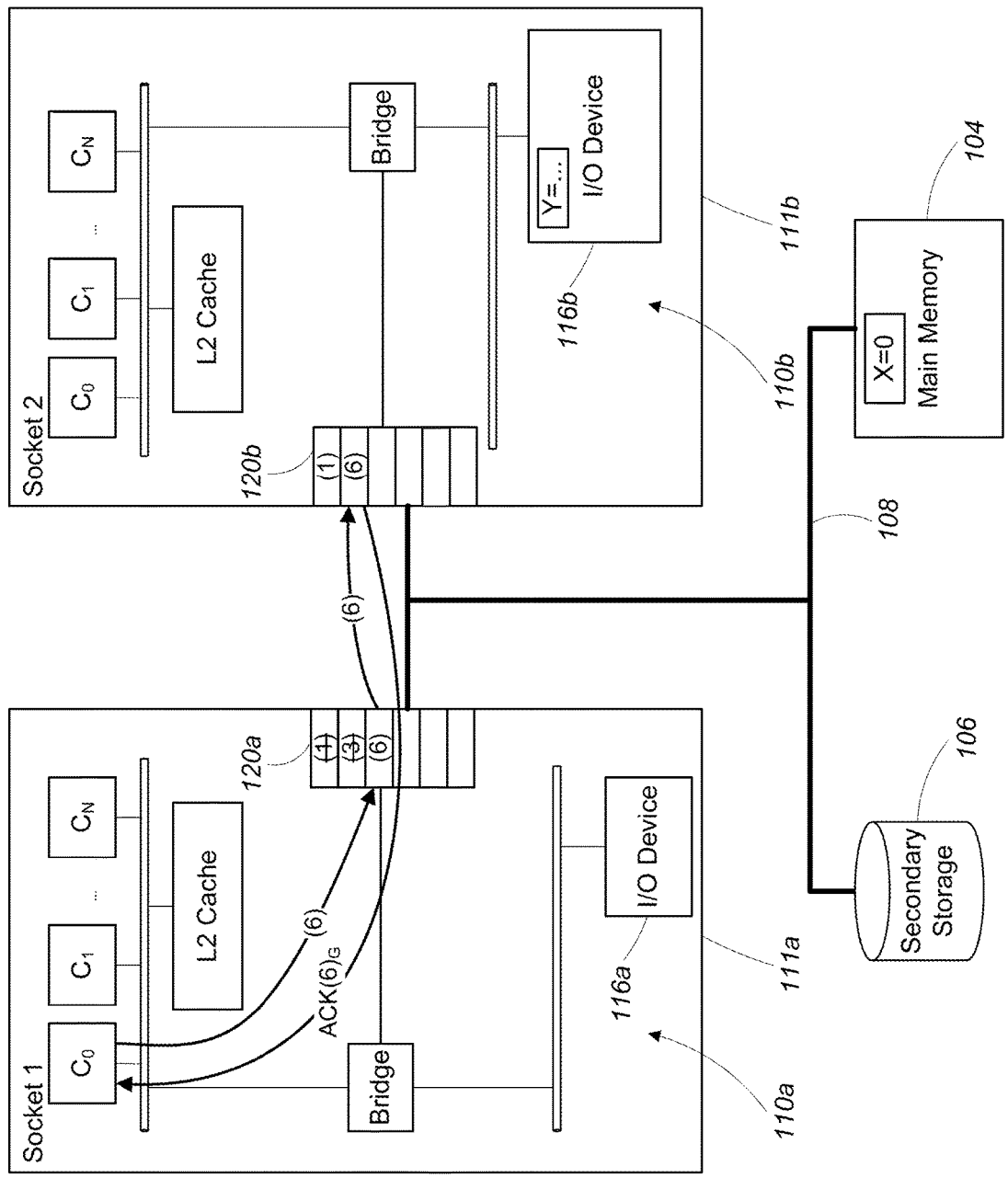
FIG. 5 illustrates a third stage of the execution of the first computer program of FIG. 2.

Referring to FIG. 5, in parallel, the while loop (4) is executing on the second core $S_0,C_1$, continually spinning as long as the value of the memory address X does not equal zero. After the second memory access instruction (3) executes (writing a value of zero into the memory address X), the while loop (4) reads the value of the memory address X and determines that the value equals 0, causing the while loop to break. After the while loop breaks, the memory barrier instruction (5) issues and completes. In general, the memory barrier (5) prevents the third memory access instruction (6) from issuing before the while loop (4) completes.

After the memory barrier instruction (5) completes, the second core $S_0,C_1$ issues the third memory access instruction (6) which is queued in the first ordering point 120a. The first ordering point 120a sends the third memory access instruction (6) over the interconnect 108 to the second ordering point 120b, where the third memory access instruction (6) is queued. Upon queuing the instruction, the second ordering point 120b sends an acknowledgement that the third memory access instruction (6) has been queued, $ACK(6)_G$, to the second core $S_0,C_1$.

Figure 6:
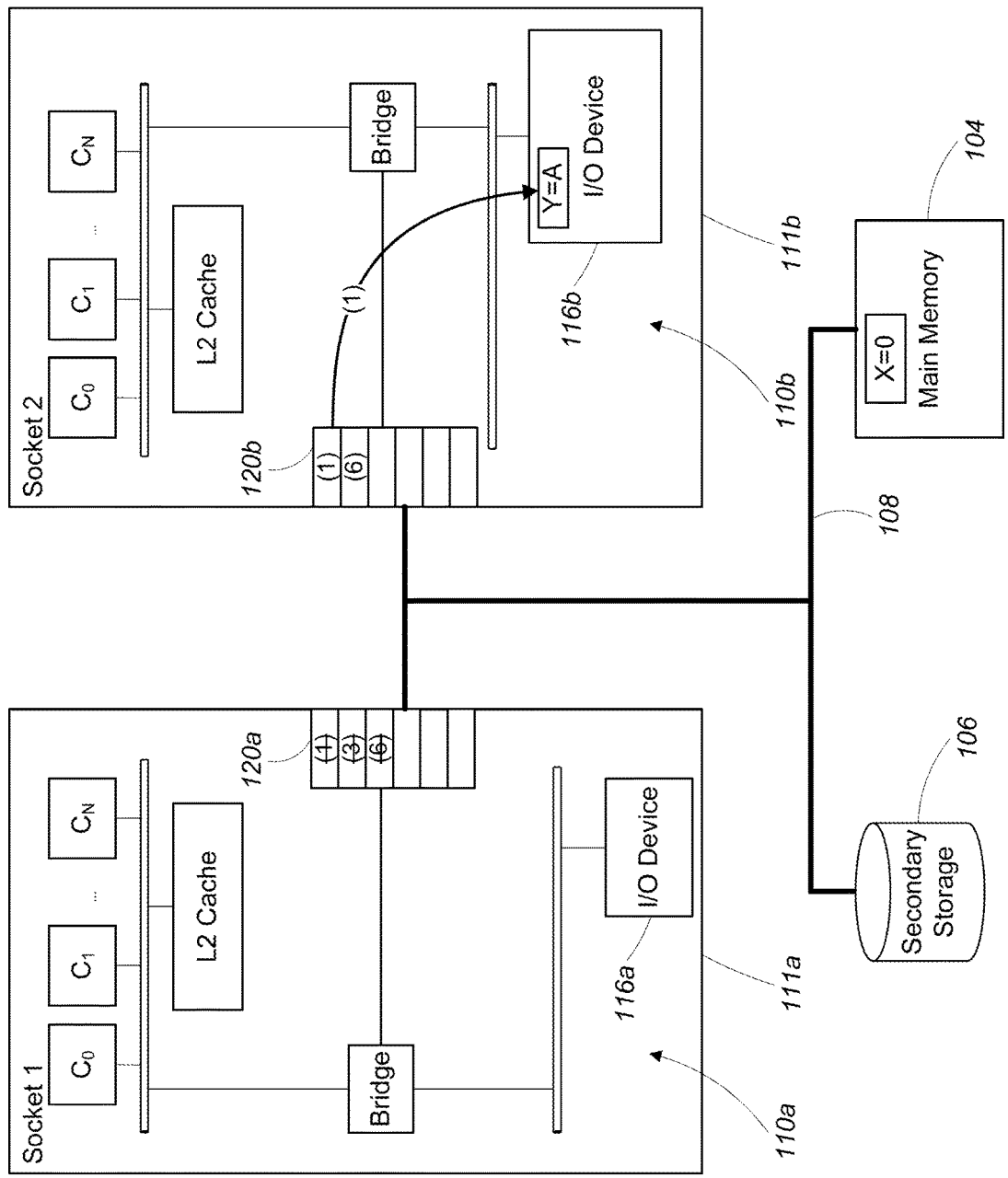
FIG. 6 illustrates a fourth stage of the execution of the first computer program of FIG. 2.

Referring to FIG. 6, at some time after the first memory access instruction (1) is queued in the second ordering point 120b, the first memory access instruction (1) is executed in the second multi-core processing element 110b, writing the value A to the memory address Y associated with the I/O device 116b.

Figure 7:
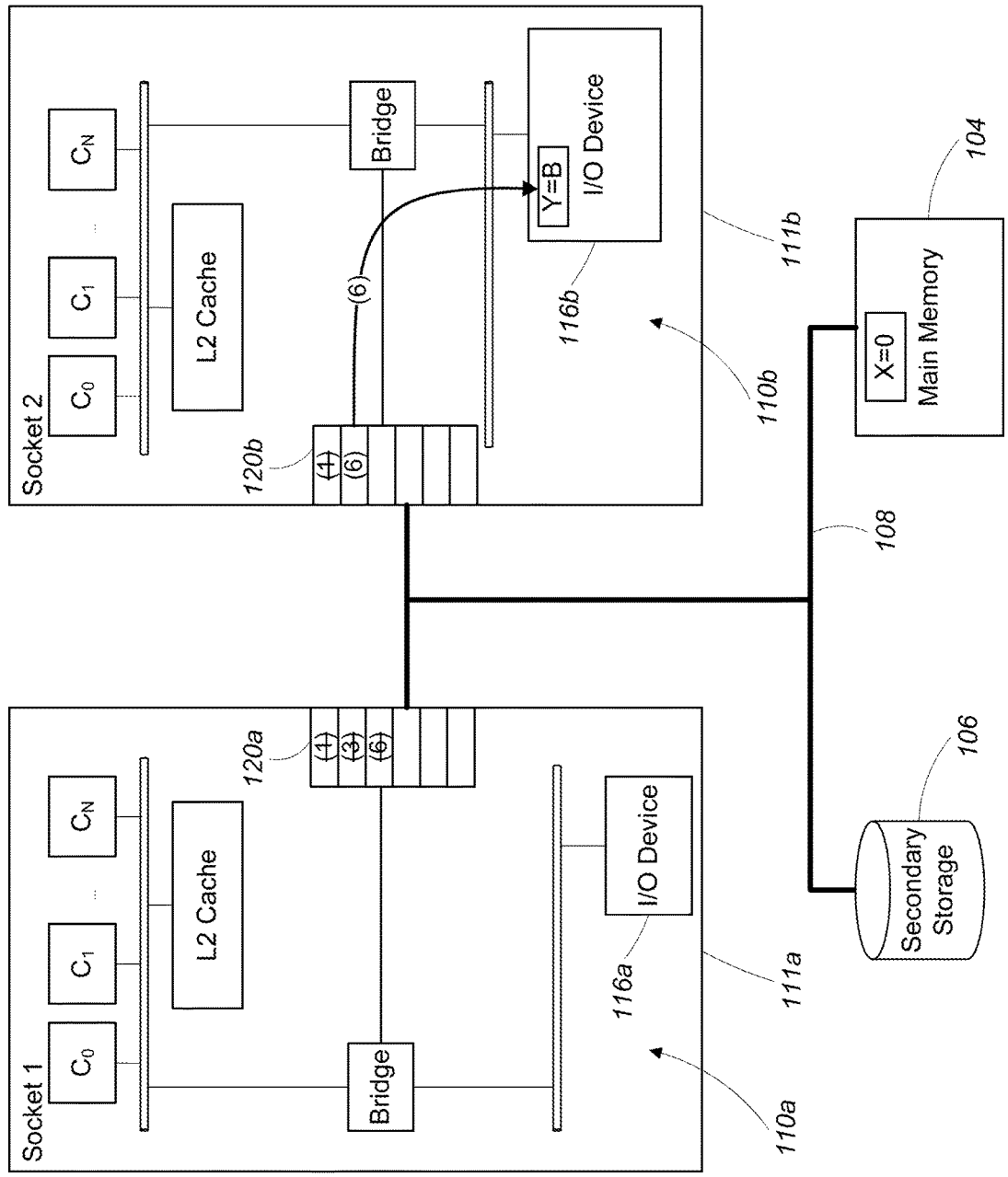
FIG. 7 illustrates a fifth stage of the execution of the first computer program of FIG. 2.

Referring to FIG. 7, at some time after the third memory access instruction (6) is queued in the second ordering point 120b and after the first memory access instruction (1) has executed, the third memory access instruction (6) is executed in the second multi-core processing element 110b, overwriting the value A in the memory address Y associated with the I/O device 116b with the value B.

Note that, in the above example, the global memory barrier instruction (2) ensures that the ordering constraint imposed on the memory access instructions at the first multi-core processing element 110a (i.e., the first memory access instruction (1) issues before the third memory access instruction (6)) is also imposed on those same memory access instructions at the second multi-core processing element 110b. That is, the global memory barrier instruction (2) ensures that an ordering constraint is observed by both local and remote processor cores 112.

In some examples, there is a need to enforce either the "global" ordering constraint (as is described in the above example), or a "local" ordering constraint. In general, when enforcing a local ordering constraint, an order of memory access instructions issued on a given multi-core processing element 110 is enforced only at the given multi-core processing element 110, whereas processor cores 112 on other, remote multi-core processing elements 110 may observe the memory access instructions as being issued in an order other than the order that they are issued at the given multi-core processing element 110.

In some examples, to implement a computing system that is capable enforcing both global ordering constraints and local ordering constraints, two types of memory barrier instructions are used: a "global" memory barrier instruction and a "local" memory barrier instruction. Furthermore, memory access instructions that are directed to remote multi-core processing elements (i.e., multi-core processing elements other than the multi-core processing element that issues the memory access instruction) in the computing system are implemented such that they cause two acknowledgement messages to be returned to a core that issued the memory access instructions (i.e., the "issuing core"). A first of the two acknowledgement messages is a "remote" acknowledgement message which is returned to the issuing core from a "remote" ordering point (e.g., an ordering point 120 on a remote multi-core processing element 110). A second of the two acknowledgement messages is a "local" acknowledgement message which is returned to the issuing core from a "local" ordering point (e.g., an ordering point 120 on the same multi-core processing element 110 as the issuing core).

A global memory barrier instruction ensures that the issuance of further memory access instructions at a given processor core 112 on a given multi-core processing element 110 is halted until a remote acknowledgement is received at the given processor core 112 for each memory access instruction issued by the given processor core 112 to a remote multi-core processing element 110 prior to issuance of the global memory barrier instruction. The global memory barrier instruction also ensures that the issuance of further memory access instructions at the given processor core 112 is halted until a local acknowledgement is received at the given processor core 112 for each memory access instruction issued by the given processor core 112 that is directed to a memory address associated with the given multi-core processing element 110 prior to issuance of the global memory barrier instruction.

A local memory barrier instruction ensures that the issuance of further memory access instructions at the given processor core 112 on the given multi-core processing element 110 is halted until a local acknowledgement is received at the given processor core 112 for each memory access instruction issued by the given processor core 112 prior to issuance of the local memory barrier instruction, regardless of whether the memory access instruction is directed to a remote multi-core processing element 110. Since the local memory barrier instruction waits for the local acknowledgement message to be received from at the local multi-core processing element but does not wait for the remote acknowledgement message to be received from the remote multi-core processing element, the ordering constraint is enforced at the local multi-core processing element but is not enforced at the remote multi-core processing element. That is, memory access instructions may execute in an order that violates the ordering constraint at the remote multi-core processing element.

Figure 8:
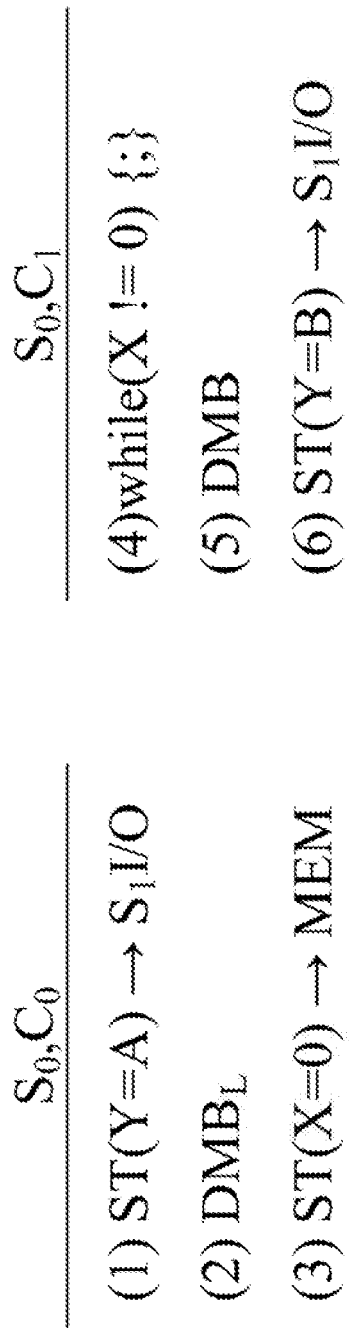
FIG. 8 is a second computer program executing on two processor cores of the computing system of FIG. 1.

Referring to FIG. 8, a simple example includes instructions of a computer program executing on two different cores (i.e., $C_0$, $C_1$) of a multi-core processing element 110 in a socket $S_0$.

A first portion of the computer program executing on a first core of the two cores, $S_0,C_1$, includes a first memory access instruction (1) ST(Y=A)→$S_1$I/O for writing a value A to a memory address Y associated with an I/O device in a second socket, $S_1$. The first portion of the computer program also includes a local memory barrier instruction (2) $DMB_L$ for halting issuance of instructions at the first core until receiving an acknowledgement that the first memory access instruction (1) has been queued by a first ordering point 108 of a first multi-core processing element 110 in the first socket $S_0$. The first portion of the computer program also includes a second memory access instruction (3) ST(X=0)→MEM for writing a zero value to a memory address X in the main memory 104.

A second portion of the computer program executing on a second core of the two cores, $S_0,C_1$, includes a while loop (4) while (X!=0) {;} which spins while the value at the memory address X is not equal to zero. The second portion of the computer program also includes a memory barrier instruction (5) DMB for preventing memory access instructions that come after the memory barrier instruction (5) from issuing before the while loop (4) completes. The second portion of the computer program also includes a third memory access instruction (6) ST(Y=B)→$S_1$I/O for writing a value B to the memory address Y associated with the I/O device in a second socket, $S_1$. Very generally, when the simple computer program executes, the local memory barrier instruction (2) ensures that the first memory access instruction (1) issues at the first socket $S_0$ before the third memory access instruction (6) issues at the first socket. Note that there is no guarantee that the first memory access instruction (1) issues at the second socket $S_1$ before the third memory access instruction (6) issues at the second socket.

Figure 9:
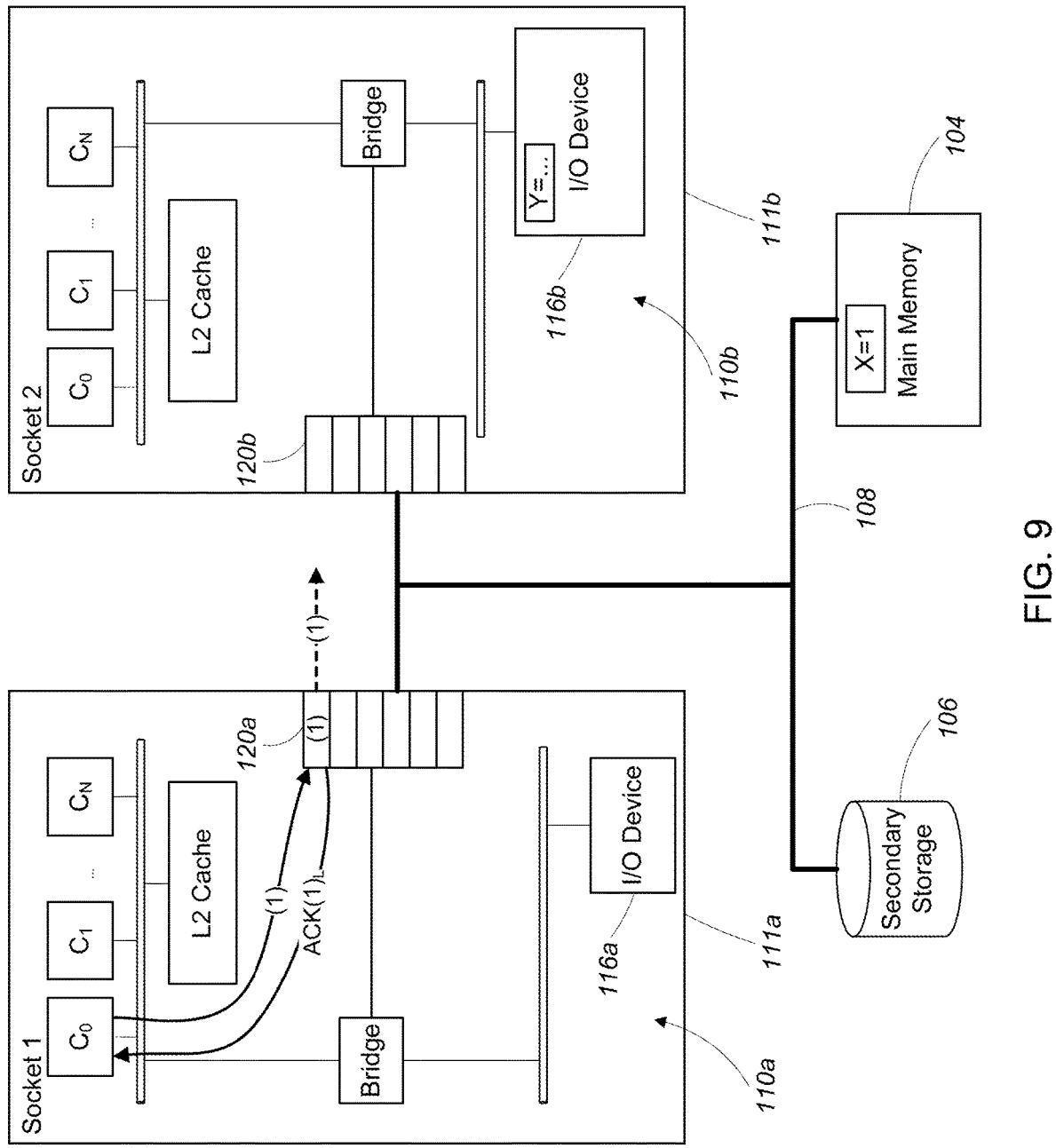
FIG. 9 illustrates a first stage of the execution of the second computer program of FIG. 8.

Referring to FIG. 9, when the simple computer program executes, the first core $S_0,C_1$, issues the first memory access instruction (1). The first core $S_0,C_1$, then issues the local memory barrier instruction (2) (now shown) which halts issuance of additional instructions on the first core until receiving an acknowledgement that the first memory access instruction (1) has been queued by a first ordering point 108a of the first multi-core processing element 110a in the first socket $S_1$.

Upon issuing, the first memory access instruction (1) is queued in the first ordering point 120a of the first multi-core processing element 110a in the first socket $S_0$. The first ordering point 120a sends the first memory access instruction (1) over the interconnect 108 to the second ordering point 120b of the second multi-core processing element 110b. The first ordering point 120a also sends a local acknowledgement that the first memory access instruction (1) has been locally queued, ACK(1)$_L$, to the first core $S_0,C_1$, causing the local memory barrier instruction (2) to complete without waiting to receive an acknowledgement from the second ordering point 120b that the first memory access instruction (1) has been remotely queued.

Figure 10:
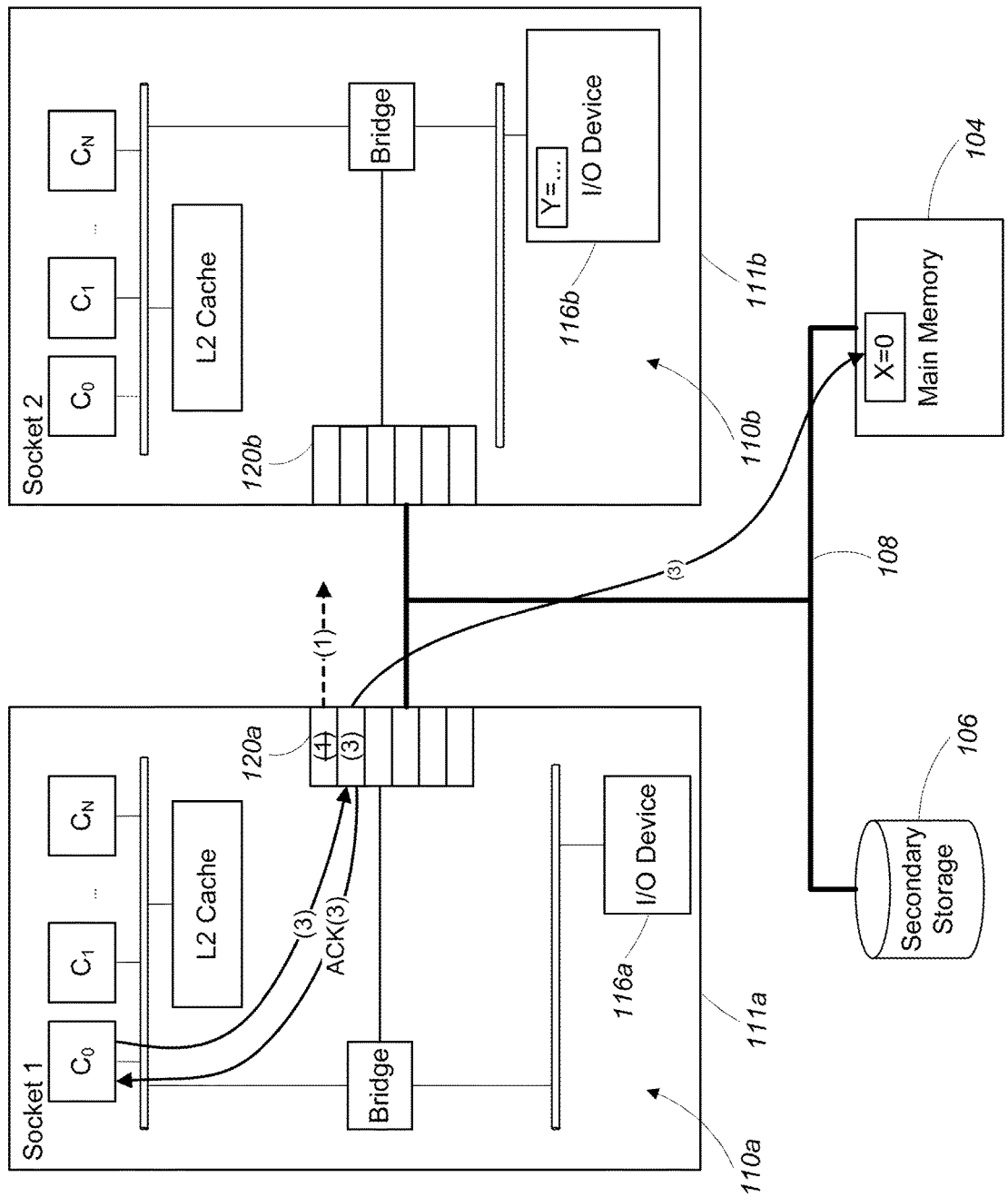
FIG. 10 illustrates a second stage of the execution of the second computer program of FIG. 8.

Referring to FIG. 10, prior to the first memory access instruction (1) arriving at the second ordering point 120b, the second memory access instruction (3) issues and is queued in the first ordering point 120a. The first ordering point 120a sends the second memory access instruction (3) over the interconnect 108 to the main memory 104 where the value zero is stored at the memory address X.

Figure 11:
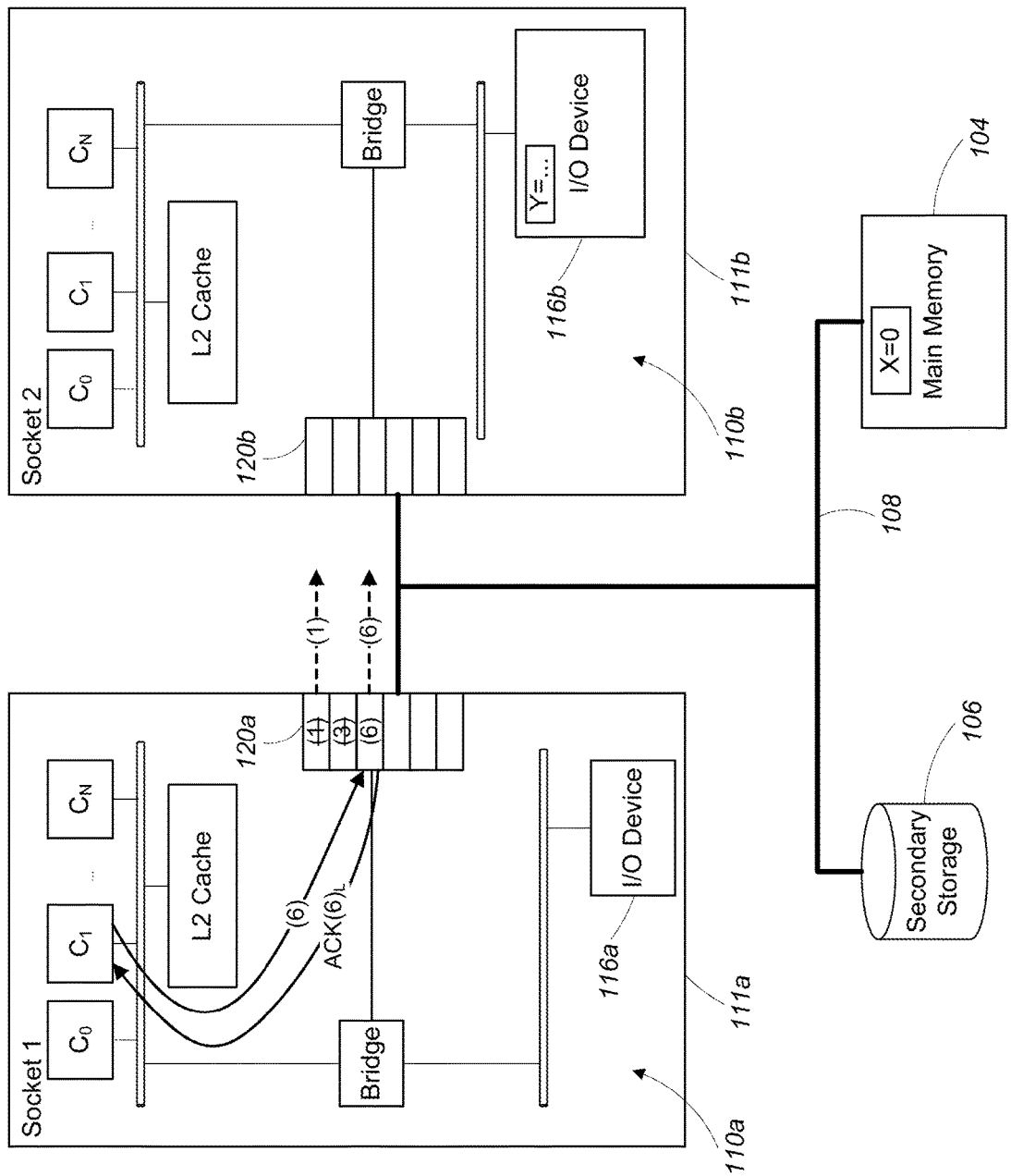
FIG. 11 illustrates a third stage of the execution of the second computer program of FIG. 8.

Referring to FIG. 11, in parallel, the while loop (4) is executing on the second core $S_0,C_1$, continually spinning as long as the value of the memory address X does not equal zero. After the second memory access instruction (3) executes (writing a value of zero into the memory address X), the while loop (4) reads the value of the memory address X and determines that the value equals zero, causing the while loop to break. After the while loop (4) breaks, the memory barrier instruction (5) issues and completes. In general, the memory barrier instruction (5) prevents the third memory access instruction (6) from issuing before the while loop (4) completes.

After the memory barrier instruction (5) completes, the second core $S_0,C_1$ issues the third memory access instruction (6) which is queued in the first ordering point 120a. The first ordering point 120a sends the third memory access instruction (6) over the interconnect 108 to the second ordering point 120b. The first ordering point 120a also sends a local acknowledgement that the third memory access instruction (6) has been locally queued, ACK(6)$_L$, to the first core $S_0,C_1$.

At the instant illustrated in FIG. 11, both the first memory access instruction (1) and the third memory access instruction (6) are in the process of being transmitted over the interconnect 108 and neither has yet arrived at the second ordering point 120b.

Figure 12:
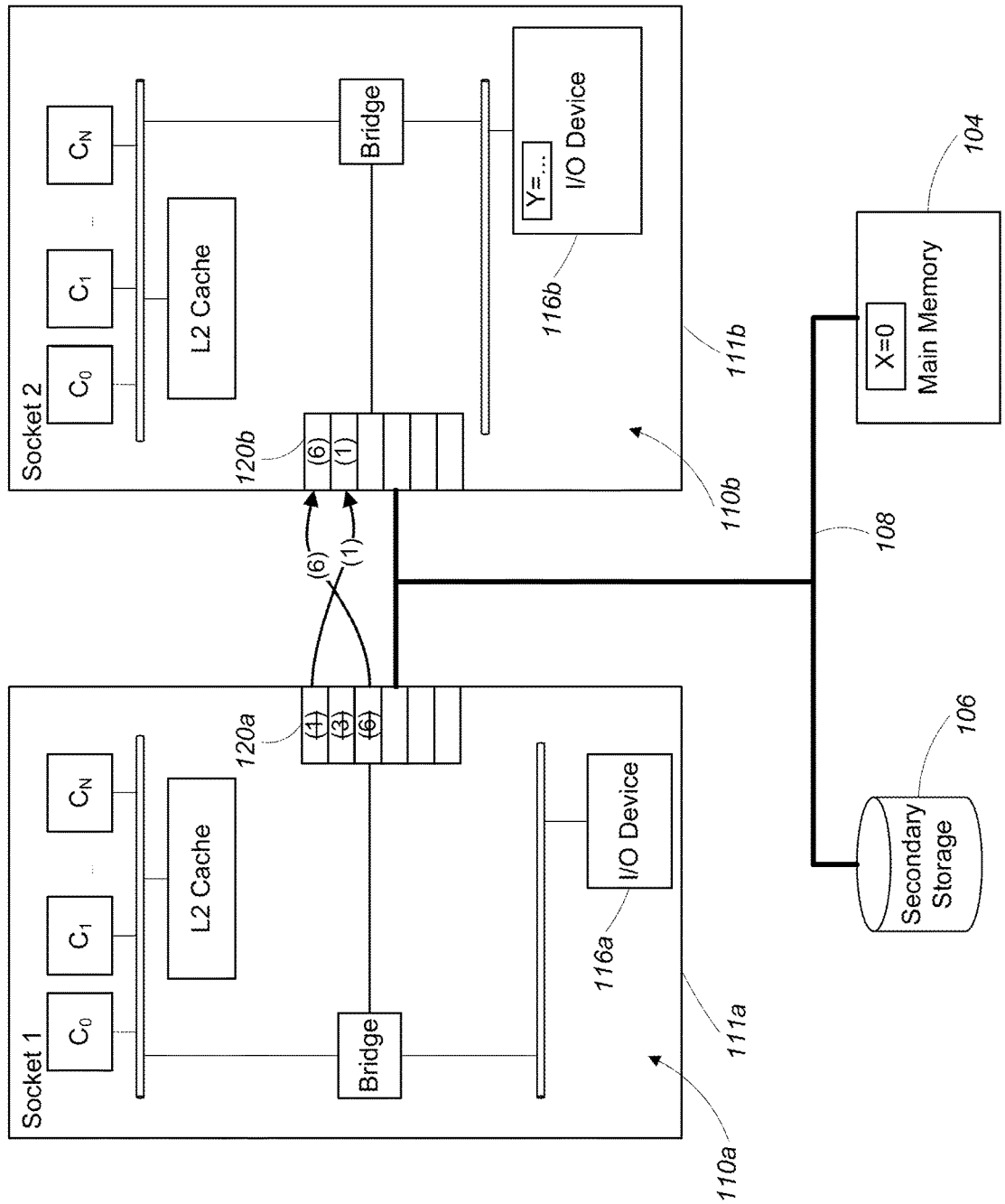
FIG. 12 illustrates a fourth stage of the execution of the second computer program of FIG. 8.

Referring to FIG. 12, the third memory access instruction (6) and the first memory access instruction (1) have arrived at the second ordering point 120b out of order. That is, the third memory access instruction (6) which was issued after the first memory instruction (1) at the first multi-core processing element 110a has arrived at, and has been queued by the second ordering point 102b before the first memory access instruction (1). In some examples, memory access instructions arrive out of order due to the distributed nature of the network connecting the multi-core processing elements. That is, the network is a distributed resource that may have multiple paths between a source and destination, at least some paths having different delays.

Figure 13:
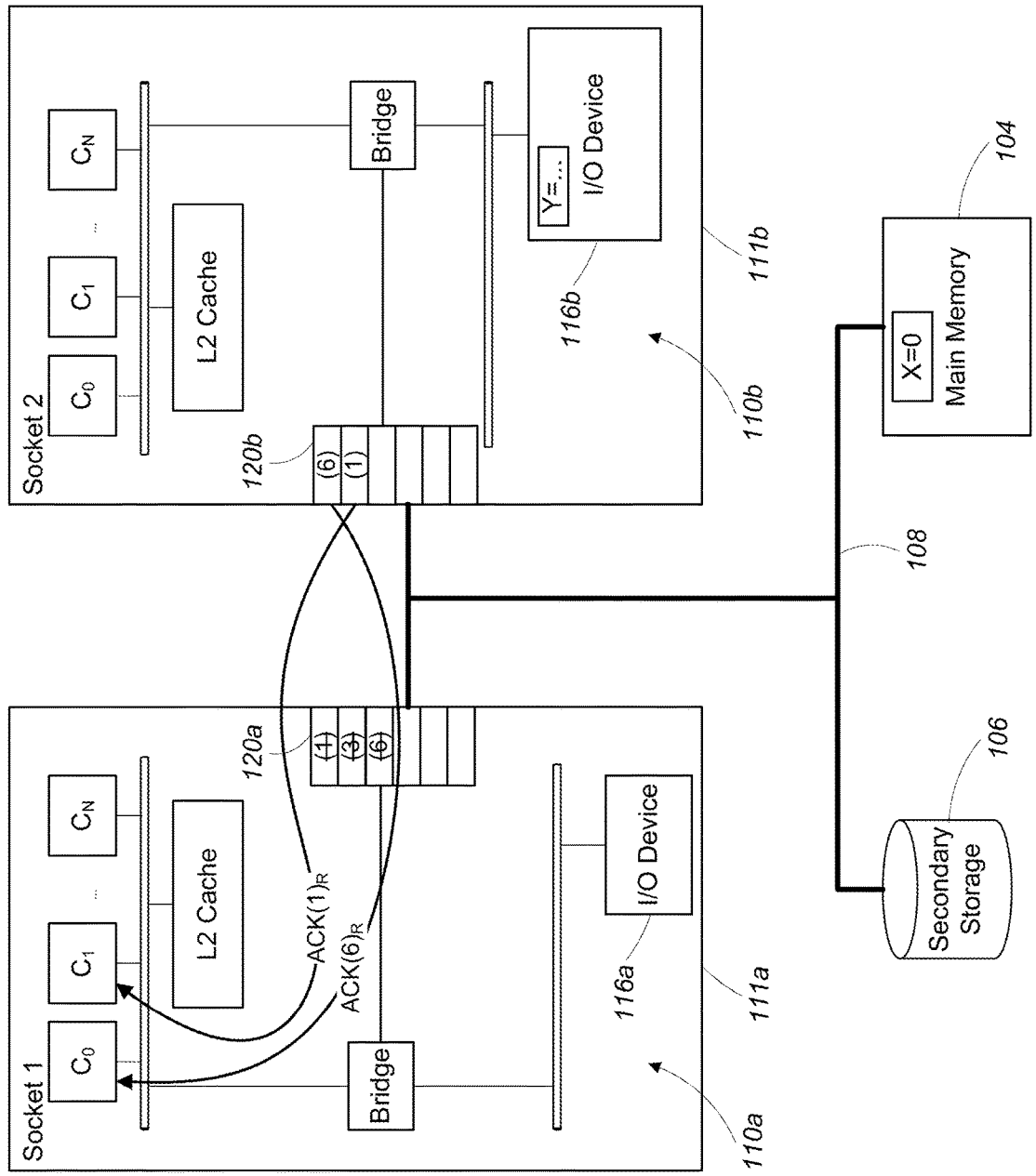
FIG. 13 illustrates a fifth stage of the execution of the second computer program of FIG. 8.

Referring to FIG. 13, at some time after the third memory access instruction (6) and the first memory access instruction (1) are queued by the second ordering point 120b, the second ordering point 120b sends a remote acknowledgement that the first and third memory access instructions have been queued, ACK(1)$_R$, ACK(6)$_R$, to the first and second cores, $S_0,C_1$, $S_0,C_1$ via the interconnect 108.

Figure 14:
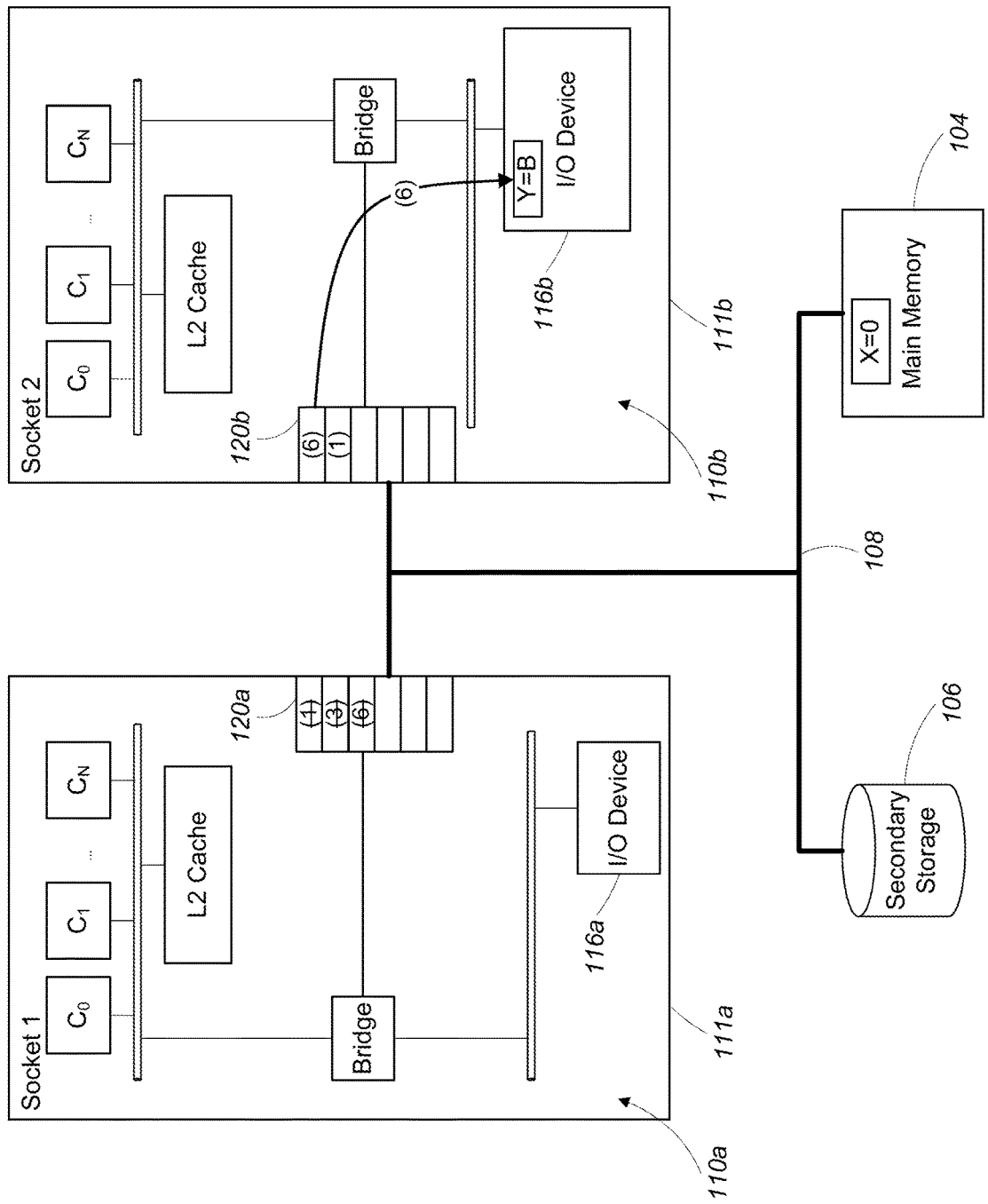
FIG. 14 illustrates a sixth stage of the execution of the second computer program of FIG. 8.

Referring to FIG. 14, at some time after the third memory access instruction (6) is queued in the second ordering point 120b, the third memory access instruction (6) is executed in the second multi-core processing element 110b, writing the value B in the memory address Y associated with the I/O device 116b.

Figure 15:
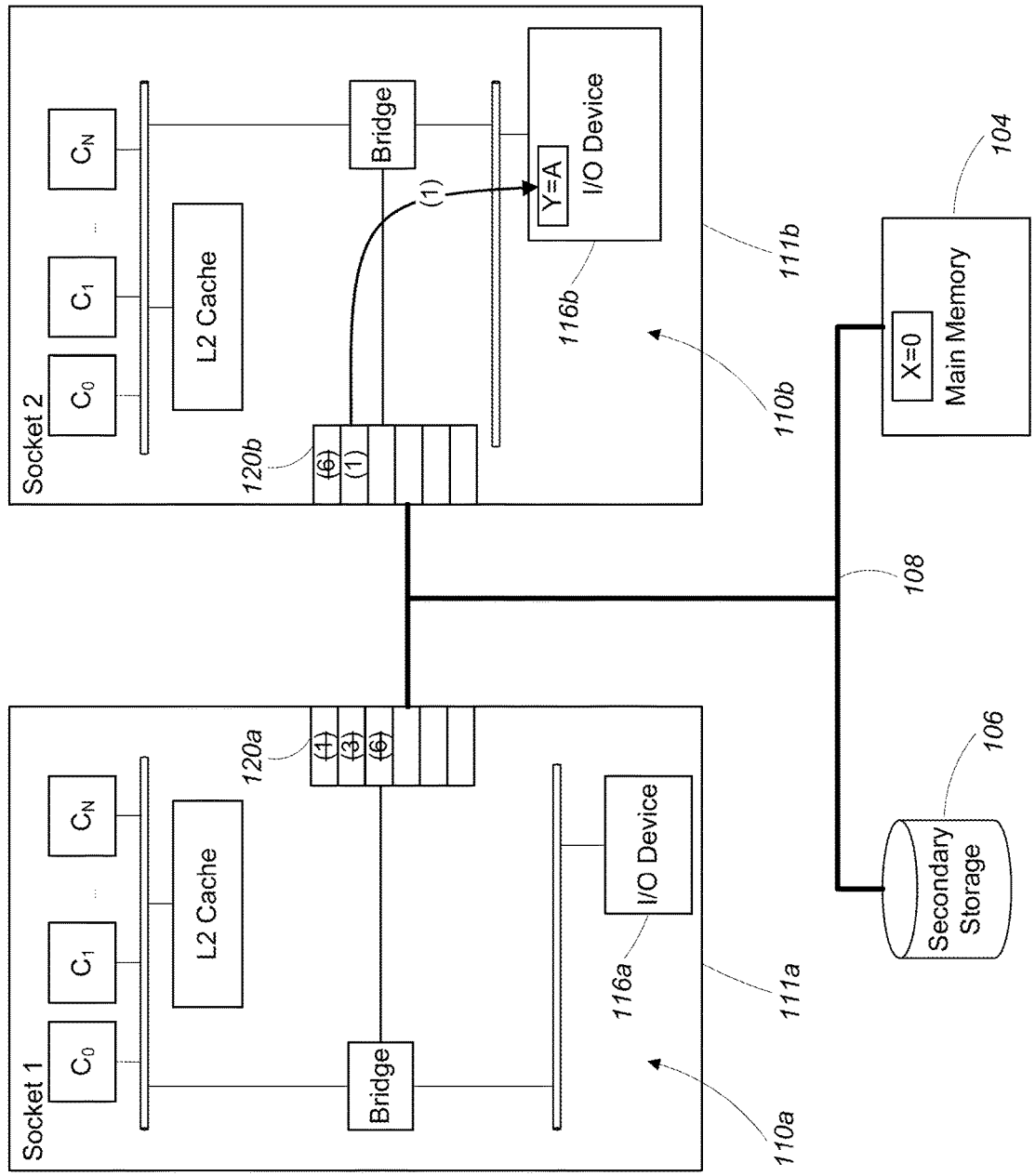
FIG. 15 illustrates a seventh stage of the execution of the second computer program of FIG. 8.

Referring to FIG. 15, at some time after the first memory access instruction (1) is queued in the second ordering point 120b and after the third memory access instruction (6) has executed, the first memory access instruction (1) is executed in the second multi-core processing element 110b, overwriting the value B in the memory address Y associated with the I/O device 116b with the value A.

Note that, in the above example, the local memory barrier instruction (2) ensures that an ordering constraint is imposed on the memory access instructions at the first multi-core processing element 110a (i.e., the first memory access instruction (1) issues before the third memory access instruction (6)) while the ordering constraint is not imposed on those same memory access instructions at the second multi-core processing element 110b, allowing for out-oforder execution of the memory access instructions at the second multi-core processing element 110b.

3 Alternatives

Figure 16:
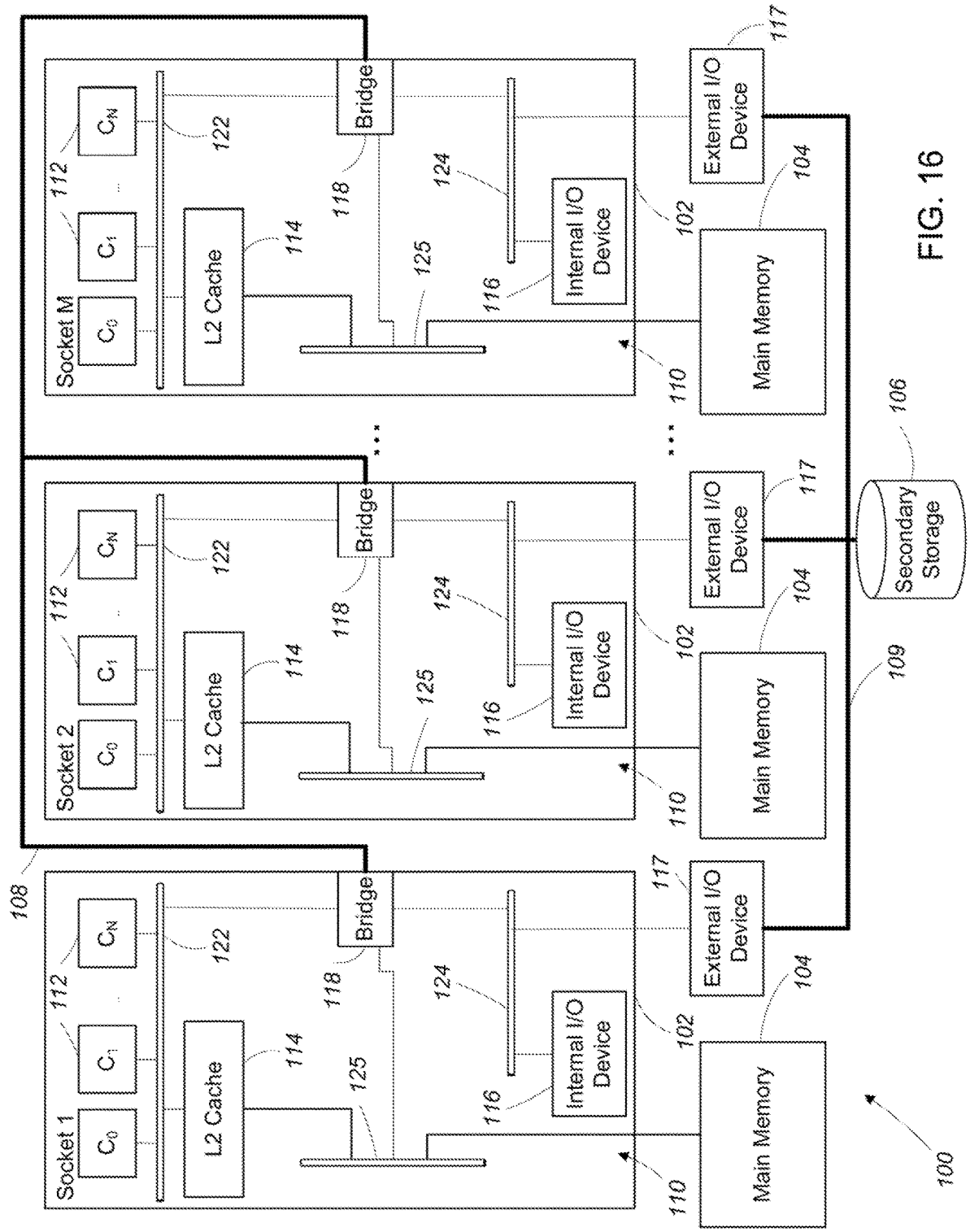
FIG. 16 is a block diagram of another embodiment of a multi-socket, multi-core computing system.

Referring to FIG. 16, in some examples, the approaches described above can be utilized on other embodiments of multi-socket, multi-core computing systems. For example, the multi-socket, multi-core computing system 100 of FIG. 16 includes M CPU sockets 102 (referred to generally as "sockets"), each in communication with a corresponding main memory 104 (e.g., dynamic random access memory (DRAM)) and one or more external input/output (I/O) devices 117. The external I/O devices 117 are in communication with one or more secondary storage devices 106 (e.g., a hard disk drive or a solid state storage device) over a storage interconnect 109. The M CPU sockets 102 are in communication with each other over a socket interconnect 108.

Each of the M CPU sockets 102 includes a multi-core processing element 110. Each of the multi-core processing elements 110 includes N processor cores 112, a level 2 (L2) cache or last level cache (LLC) 114, one or more internal input/output (I/O) devices 116 and a bridge 118. The N processor cores 112 and the L2 cache 114 are in direct communication with a processor bus 122. The one or more internal I/O devices 116 and the one or more external I/O devices 117 are in direct communication with an I/O bus 124. The main memory 104 and the L2 cache 114 are in direct communication with a memory bus 125. The processor bus 122, the I/O bus 124, and the memory bus 125 are in communication with one another via the bridge 118.

In some examples, the ordering points are implemented as part of the memory subsystem. In some examples, the ordering points are implemented as part of the L2 caches of the multi-core processing elements. In some examples, the definition of what is "local" is specific to an implementation is not restricted, for example, to a single socket. In general, regardless of where a local ordering point is implemented, it is important that the local ordering point allows a data memory barrier instruction to complete prior to receiving acknowledgements that remote memory access instructions have issued at remote sockets.

In some examples, a memory address for each memory access instruction includes an indicator of whether the memory address is associated with main memory (e.g., a coherent memory) or a non-coherent memory such as memory associated with an I/O device. The memory barrier instructions can use the indicators of memory access instructions issued prior to the memory barrier instructions to determine which acknowledgement messages are required for the memory barrier instructions to complete.

In some examples, memory in the multi-socket, multi-core computing system 100 can be classified as being part of a non-sharable domain (e.g., memory that is private to a multi-core processing element), part of a inner sharable domain (e.g., cache coherent memory such as the main memory), or part of an outer sharable domain (e.g., non-coherent memory such as memory mapped to I/O devices). In some examples, each of the domains is associated with a different memory barrier instruction. In some examples, a memory barrier instruction for memory addresses that are part of the non-sharable domain can be specified as either a global memory barrier instruction (e.g., DMB NSH) or as a local memory barrier instruction (e.g., DMB NSH*, where the asterisk indicates that the memory barrier is local). A memory barrier instruction for memory addresses that are part of the inner-sharable domain can be specified as either a global memory barrier instruction (e.g., DMB ISH) or as a local memory barrier instruction (e.g., DMB ISH*). A memory barrier instruction for memory addresses that are part of the outer-sharable domain can be specified as either a global memory barrier instruction (e.g., DMB OSH) or as a local memory barrier instruction (e.g., DMB OSH*).

In some examples, a program may include a conflict between two or more memory barrier instructions. For example, one memory barrier instruction may indicate that local ordering is required while another memory barrier instruction indicates that global ordering is required. In such cases, the memory barrier instruction indicating that global ordering is required takes precedence and global order of the memory access instructions is enforced.

In the examples described above, two ordering domains exist, with a first ordering domain encompassing an entirety of a first socket and a second ordering domain encompassing an entirety of a second socket. However, ordering domains are not limited to encompassing entire sockets. For example, a single socket may include a first ordering domain encompassing a first plurality of processor cores in the socket and a second ordering domain encompassing a second plurality of processor cores in the socket. In another example, a single ordering domain can encompass cores in two or more sockets. For example, a single ordering domain can encompass a first plurality of cores in a first socket and a second plurality of cores in a second socket.

It is to be understood that the foregoing description is intended to illustrate and not to limit the scope of the invention, which is defined by the scope of the appended claims. Other embodiments are within the scope of the following claims.

What is claimed is:

1. A method for managing an observed order of instructions in a computing system, the method comprising:
   executing a plurality of instructions at a first plurality of processing elements in the computing system, the executing including
      issuing at least a first instruction of the plurality of instructions at a first processing element, the first instruction being configured to access memory associated with a second plurality of processing elements in the computing system; and
      issuing a second instruction of the plurality of instructions at the first processing element, the second instruction causing the first processing element to pause issuance of further instructions for accessing memory in a first memory domain of a plurality of memory domains in the computing system until the first processing element receives one or more first acknowledgements that at least the first instruction of the plurality of instructions has reached a first location in circuitry of the first plurality of processing elements;
   wherein the second instruction is specified as being associated with the first memory domain of the plurality of memory domains in the computing system; and
   wherein the first processing element receives a second acknowledgement that at least the first instruction of the plurality of instructions has reached a second location in circuitry of the second plurality of processing elements.

2. The method of claim 1 further comprising issuing at least a third instruction of the plurality of instructions at a second processing element of the first plurality of processing elements, the third instruction configured to access the memory associated with the second plurality of processing elements, wherein at least the third instruction is constrained to issue after completion of the second instruction is observed by the first plurality of processing elements.

3. The method of claim 2 wherein the third instruction reaches the second location in the circuitry of the second plurality of processing elements prior to the first instruction reaching the first location in the circuitry of the first plurality of processing elements.

4. The method of claim 1 wherein the second instruction includes a memory barrier instruction.

5. The method of claim 1 wherein the first location in the circuitry of the first plurality of processing elements includes a first ordering point from which the one or more first acknowledgements originate and the second location in the circuitry of the second plurality of processing elements includes a second ordering point from which the second acknowledgement originates.

6. The method of claim 5 wherein instructions received at the first ordering point in a first received order are issued at the first plurality of processing elements in the first received order and instructions received at the second ordering point in a second received order are issued at the second plurality of processing elements in the second received order.

7. The method of claim 1 wherein at least some instructions of the plurality of instructions are memory access instructions.

8. The method of claim 7 wherein the at least some instructions of the plurality of instructions access memory addresses associated with memory mapped peripheral devices.

9. The method of claim 8 wherein the at least some instructions of the plurality of instructions access memory addresses associated with input/output devices.

10. The method of claim 9 wherein the first instruction is configured to access a memory address associated with an input/output device associated with the second plurality of processing elements.

11. The method of claim 1 wherein the first plurality of processing elements is associated with a first multi-element processing device located in a first CPU socket and the second plurality of processing elements is associated with a second multi-element processing device located in a second CPU socket.

12. The method of claim 1 wherein the first plurality of processing elements is associated with a first multi-element processing device located in a first CPU socket and the second plurality of processing elements is associated with the first multi-element processing device located in the first CPU socket.

13. The method of claim 1 wherein a first subset of the first plurality of processing elements is associated with a first multi-element processing device located in a first CPU socket and a second subset of the first plurality of processing elements is associated with a second multi-element processing device located in a second CPU socket.

14. The method of claim 13 wherein a first subset of the second plurality of processing elements is associated with the first multi-element processing device located in the first CPU socket and a second subset of the second plurality of processing elements is associated with the second multi-element processing device located in the second CPU socket.

15. The method of claim 1 further comprising executing a second plurality of instructions at a third plurality of processing elements in the computing system, the executing including issuing at least a third instruction of the second plurality of instructions at a third processing element of the third plurality of processing elements, the third instruction being configured to access memory associated with a fourth plurality of processing elements in the computing system; and issuing a fourth instruction of the second plurality of instructions at the third processing element, the fourth instruction causing the third processing element to pause issuance of further instructions for accessing memory in the computing system until the third processing element receives one or more third acknowledgements indicating that at least the third instruction has reached a third location in circuitry of the third plurality of processing elements.

16. An apparatus for managing an observed order of instructions in a computing system, the apparatus comprising:

a first plurality of processing elements for executing a plurality of instructions, the first plurality of processing elements including a first processing element for:
issuing at least a first instruction of the plurality of instructions, the first instruction being configured to access memory associated with a second plurality of processing elements in the computing system; and
issuing a second instruction of the plurality of instructions, the second instruction causing the first processing element to pause issuance of further instructions for accessing memory in a first memory domain of a plurality of memory domains in the computing system until the first processing element receives one or more first acknowledgements that at least the first instruction of the plurality of instructions has reached a first location in circuitry of the first plurality of processing elements;
wherein the second instruction is specified as being associated with the first memory domain of the plurality of memory domains in the computing system; and
wherein the first processing element receives a second acknowledgement that at least the first instruction of the plurality of instructions has reached a second location in circuitry of the second plurality of processing elements.

17. The method of claim 1 wherein an address of memory accessed by the first instruction is included in the first memory domain.

18. The method of claim 1 wherein the second instruction is specified as enforcing one of either: (1) a local ordering constraint for instructions accessing memory in the first memory domain, or (2) a global ordering constraint for instructions accessing memory in the first memory domain.

19. The method of claim 18 wherein the second instruction is specified as enforcing the local ordering constraint, and the first processing element receives the one or more first acknowledgements before the first processing element receives the second acknowledgement.

20. The apparatus of claim 16 wherein the first processing element issues at least a third instruction of the plurality of instructions at a second processing element of the first plurality of processing elements, the third instruction configured to access the memory associated with the second plurality of processing elements, wherein at least the third instruction is constrained to issue after completion of the second instruction is observed by the first plurality of processing elements.

21. The apparatus of claim 20 wherein the third instruction reaches the second location in the circuitry of the second plurality of processing elements prior to the first instruction reaching the first location in the circuitry of the first plurality of processing elements.

22. The apparatus of claim 16 wherein the second instruction includes a memory barrier instruction.

23. The apparatus of claim 16 wherein the first location in the circuitry of the first plurality of processing elements includes a first ordering point from which the one or more first acknowledgements originate and the second location in the circuitry of the second plurality of processing elements includes a second ordering point from which the second acknowledgement originates.

24. The apparatus of claim 23 wherein instructions received at the first ordering point in a first received order are issued at the first plurality of processing elements in the first received order and instructions received at the second ordering point in a second received order are issued at the second plurality of processing elements in the second received order.

25. The apparatus of claim 16 wherein at least some instructions of the plurality of instructions are memory access instructions.

26. The apparatus of claim 25 wherein the at least some instructions of the plurality of instructions access memory addresses associated with memory mapped peripheral devices.

27. The apparatus of claim 26 wherein the at least some instructions of the plurality of instructions access memory addresses associated with input/output devices.

28. The apparatus of claim 27 wherein the first instruction is configured to access a memory address associated with an input/output device associated with the second plurality of processing elements.

29. The apparatus of claim 16 wherein the first plurality of processing elements is associated with a first multi-element processing device located in a first CPU socket and the second plurality of processing elements is associated with a second multi-element processing device located in a second CPU socket.

30. The apparatus of claim 16 wherein the first plurality of processing elements is associated with a first multi-element processing device located in a first CPU socket and the second plurality of processing elements is associated with the first multi-element processing device located in the first CPU socket.

31. The apparatus of claim 16 wherein a first subset of the first plurality of processing elements is associated with a first multi-element processing device located in a first CPU socket and a second subset of the first plurality of processing elements is associated with a second multi-element processing device located in a second CPU socket.

32. The apparatus of claim 31 wherein a first subset of the second plurality of processing elements is associated with the first multi-element processing device located in the first CPU socket and a second subset of the second plurality of processing elements is associated with the second multi-element processing device located in the second CPU socket.

33. The apparatus of claim 16 further comprising a third plurality of processing elements in the computing system for executing a second plurality of instructions, the executing including
  issuing at least a third instruction of the second plurality of instructions at a third processing element of the third plurality of processing elements, the third instruction being configured to access memory associated with a fourth plurality of processing elements in the computing system; and
  issuing a fourth instruction of the second plurality of instructions at the third processing element, the fourth instruction causing the third processing element to pause issuance of further instructions for accessing memory in the computing system until the third processing element receives one or more third acknowledgements indicating that at least the third instruction has reached a third location in circuitry of the third plurality of processing elements.

34. The apparatus of claim 16 wherein an address of memory accessed by the first instruction is included in the first memory domain.

35. The apparatus of claim 16 wherein the second instruction is specified as enforcing one of either: (1) a local ordering constraint for instructions accessing memory in the first memory domain, or (2) a global ordering constraint for instructions accessing memory in the first memory domain.

36. The apparatus of claim 35 wherein the second instruction is specified as enforcing the local ordering constraint, and the first processing element receives the one or more first acknowledgements before the first processing element receives the second acknowledgement.

* * * * *